US007128534B2

(12) United States Patent
Enomoto et al.

(10) Patent No.: US 7,128,534 B2
(45) Date of Patent: Oct. 31, 2006

(54) FRANCIS TURBINE

(75) Inventors: Yasuyuki Enomoto, Chiba-ken (JP); Kaneo Sugishita, Kanagawa-ken (JP); Sadao Kurosawa, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 178 days.

(21) Appl. No.: 10/867,203

(22) Filed: Jun. 15, 2004

(65) Prior Publication Data

US 2005/0013691 A1 Jan. 20, 2005

(30) Foreign Application Priority Data

Jun. 16, 2003 (JP) .............................. 2003-171108

(51) Int. Cl.
*F03B 3/02* (2006.01)
(52) U.S. Cl. .................. 416/185; 416/243; 416/DIG. 2
(58) Field of Classification Search ................. 416/185, 416/188, 243, DIG. 2
See application file for complete search history.

(56) References Cited

U.S. PATENT DOCUMENTS

| 147,351 A | * | 2/1874 | Tyler ....................... 416/186 R |
| 1,942,995 A | | 1/1934 | G.A. Biggs |
| 2,484,554 A | | 10/1949 | Concordia et al. |
| 3,639,080 A | | 2/1972 | Yamabe |
| 3,874,819 A | | 4/1975 | Tamura et al. |
| 3,918,627 A | * | 11/1975 | Kawano et al. ............. 228/178 |
| 4,479,757 A | | 10/1984 | Holmes et al. |
| 6,135,716 A | | 10/2000 | Billdal et al. |

OTHER PUBLICATIONS

Office Action in U.S. Appl. No. 10/867,207, dated Nov. 28, 2005.
U.S. Appl. No. 10/867,207, filed Jun. 15, 2004, Enomoto et al.
U.S. Appl. No. 10/914,639, filed Aug. 10, 2004, Enomoto et al.
Y. Enomoto, U.S. PTO Office Action, U.S. Appl. No. 10/914,639, filed Mar. 24, 2006, 9 pages.
Office Action in U.S. Appl. No. 10/914,639 dated Aug. 7, 2006.

* cited by examiner

*Primary Examiner*—Ninh H. Nguyen
(74) *Attorney, Agent, or Firm*—Foley & Lardner LLP

(57) ABSTRACT

A Francis turbine with a improved shape of blades to reduce the secondary flow around the blades and improve the hydraulic efficiency is provided. A Francis turbine comprises a rotating shaft, a crown, a plurality of blades and a band. The band is coaxially coupled with the crown by the blades and the rotating shaft, the crown, the blades, and the band as a whole are driven by water and rotate toward a turbine direction during a turbine operation. On a leading edge of at least one of the blades, a local maximum point exists between the crown and the band. The leading edge leans toward the turbine direction from the band connecting point, where the band and the leading edge are connected. And, a circumferential distance in the rotating direction between the band connecting point and the leading edge is the largest at the local maximum point.

12 Claims, 11 Drawing Sheets

FRANCIS TURBINE

CROSS REFERENCE TO RELATED APPLICATION

This application is based upon and claims the benefit of priority from prior Japanese Patent Application No. 2003-171108 filed on Jun. 16, 2003, the entire contents of which are incorporated herein by reference.

FIELD OF THE INVENTION

This invention relates to a Francis turbine that is used for a hydraulic turbine or a pump, and in particular, a Francis turbine runner having blades with an improved shape on a leading edge.

BACKGROUND

A Francis turbine is used in a hydraulic machine, including a reversible pump-turbine, for power generation.

A conventional Francis turbine runner is described in U.S. Pat. No. 4,479,757. This conventional Francis turbine runner includes blades whose inlet (a leading edge) shape is curved toward a direction opposite to a rotating direction of a turbine operation from a band side to a crown side.

Another conventional Francis turbine runner is described in U.S. Pat. No. 6,135,716. This conventional Francis turbine runner includes blades whose outlet (a trailing edge) shape is curved toward a rotating direction of a turbine direction from a crown side to a band side. This conventional Francis turbine runner also includes blades whose inlet (a leading edge) shape is curved toward a rotating direction of a turbine operation from a band side to a crown side.

Those shapes of the blades of conventional Francis turbines are developed to improve a hydraulic efficiency or to reduce cavitations. Still there is room to develop the shape of the blades that improves the efficiency because of the recent development of technology in fields such as computational fluid dynamics.

Especially, it is known that secondary flow, which is a flow not being along a flow line, distorts a pressure distribution on the blades and results in loss of hydraulic efficiency.

SUMMARY OF THE INVENTION

Accordingly, an advantage of an aspect of the present invention is to provide a Francis turbine with an improved shape of blades to reduce the secondary flow around the blades and improve the hydraulic efficiency.

To achieve the above advantage, one aspect of the present invention is to provide a Francis turbine that comprises a rotating shaft, a crown rotating with the rotating shaft, a plurality of blades circumferentially arranged on the crown, each of which includes an outer end as a leading edge, a band coaxially coupled with the crown by the blades, and a local maximum point existing between the crown and the band on at least one of the leading edges, wherein the rotating shaft, the crown, the blades, and the band as a whole are driven by water and rotate toward a turbine direction during a turbine operation, wherein the leading edge has a band connecting point where the band and the leading edge are connected, wherein the leading edge leans toward the turbine direction from the band connecting point, wherein a circumferential distance in the rotating direction between the band connecting point and the leading edge is the largest at the local maximum point.

Further, another aspect of the present invention is to provide a Francis turbine runner that is rotatable around a rotation axis that comprises a crown, which can rotate around the rotation axis, a plurality of blades circumferentially arranged on the crown, each of which includes an outer end as a leading edge, a band coaxially coupled with the crown by the blades, and a local maximum point existing between the crown and the band on at least one of the leading edges, wherein the crown, the blades, and the band as a whole are driven by water and rotate toward a turbine direction during a turbine operation, wherein a circular cylindrical coordinate system defined by parameters r, $\theta$, and z can be introduced such that, (a) an origin is set on the rotation axis at a position where the leading edge and the band connect, (b) a positive direction of $\theta$ is set to the turbine direction, (c) a positive direction of z is set toward a direction of the crown, wherein a projected profile of the leading edge on a cylindrical surface expressed by the cylindrical coordinate system using $\theta$ and z is as, (d)

$$\frac{\partial^2 \theta}{\partial z^2} < 0$$

at least in the band side, and (e)

$$\frac{\partial \theta}{\partial z} = 0$$

at the local maximum point.

Further features, aspects and advantages of the present invention will become apparent from the detailed description of preferred embodiments that follows, when considered together with the accompanying figures.

DETAILED DESCRIPTION OF THE PREFERRED EMBODIMENTS

A first embodiment in accordance with the present invention will be explained with reference to FIGS. 1 to 11.

Figure 1:
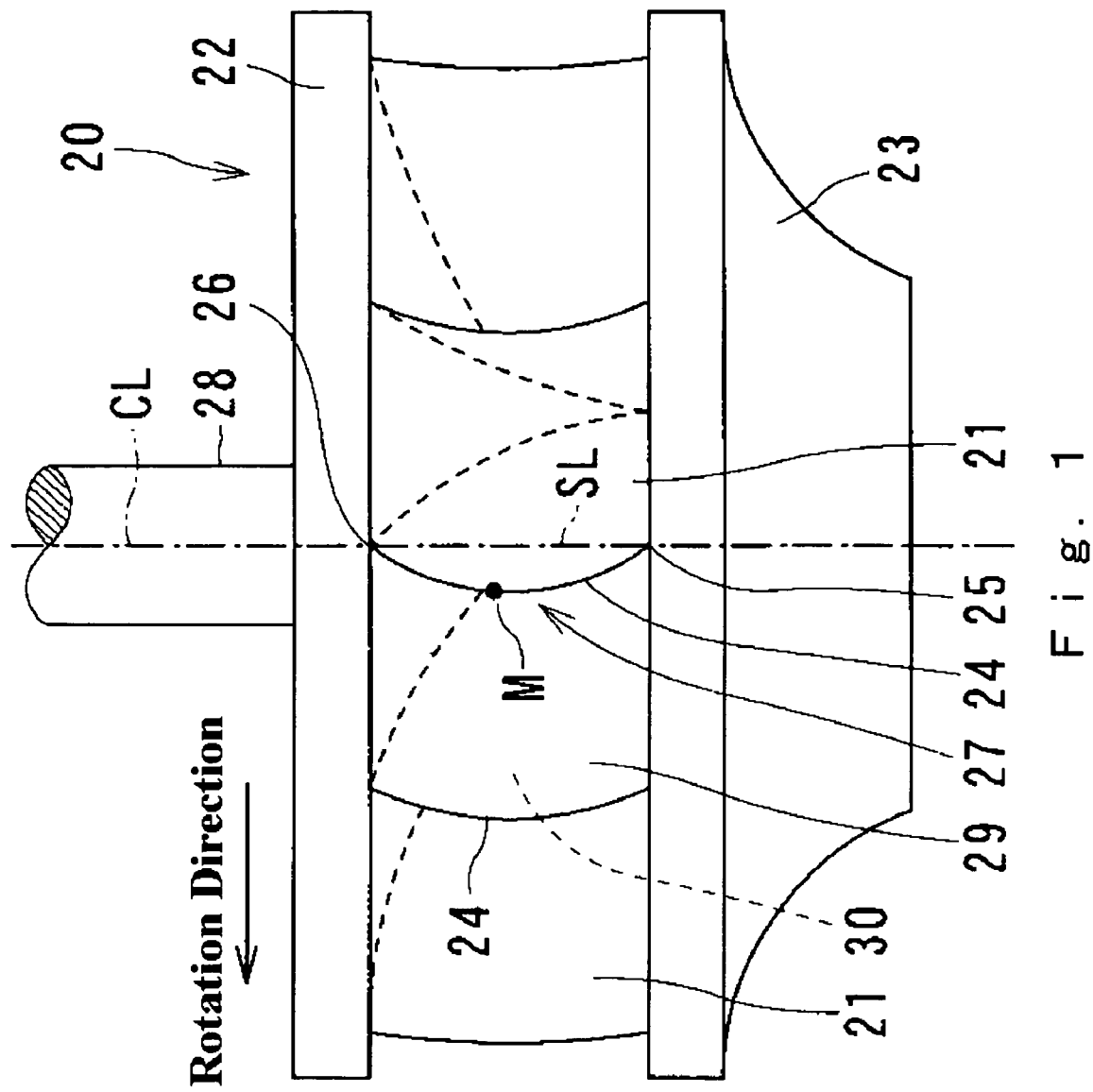
FIG. 1 is a schematic side view of a runner for a Francis turbine according to the first embodiment.
Figure 2:
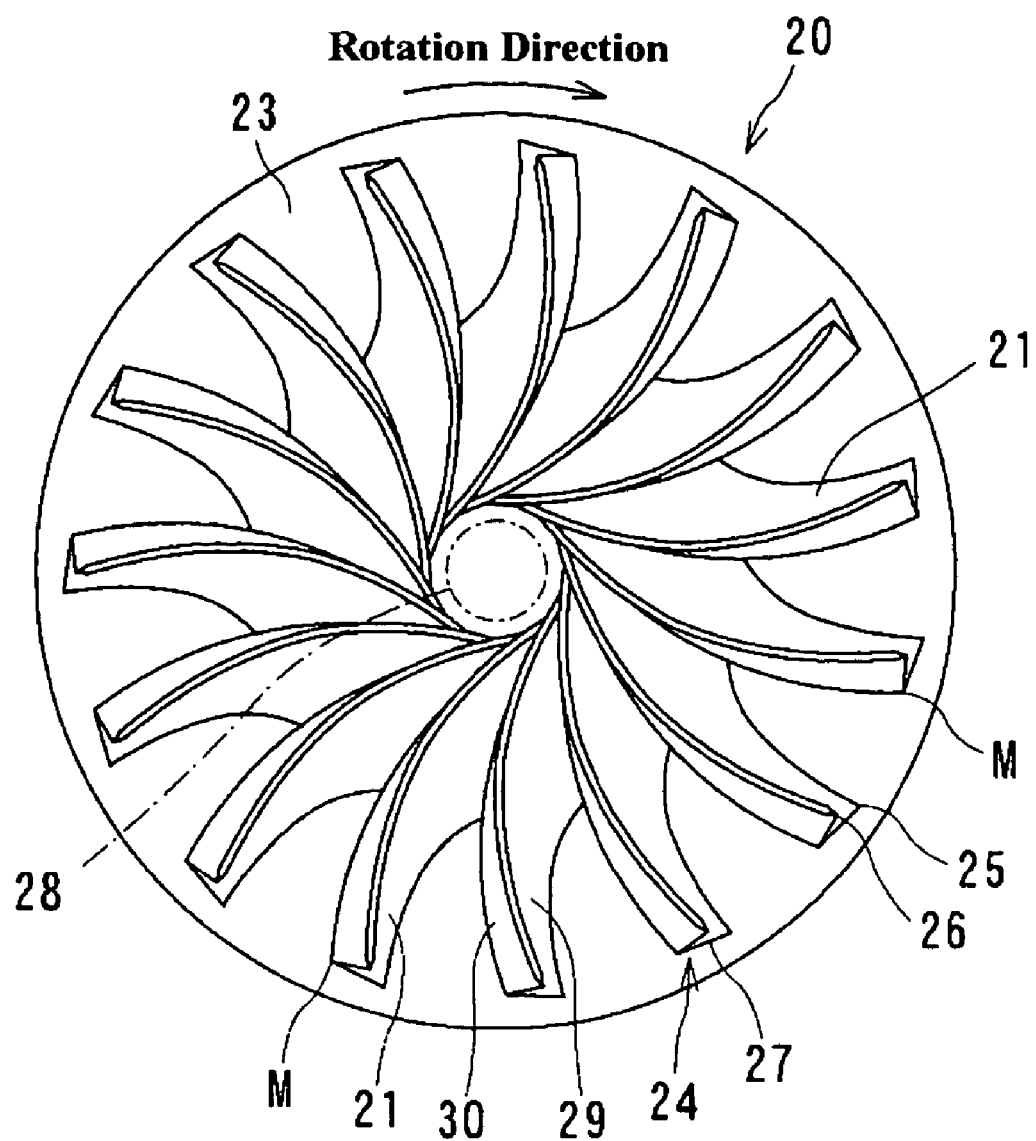
FIG. 2 is a schematic plan view of a runner for a Francis turbine according to the first embodiment.

FIG. 1 and FIG. 2 are schematic views of a runner for a Francis turbine according to the first embodiment. FIG. 1 is a side view of the runner seen from a circumferential side of the runner, and FIG. 2 is a plan view of runner blades seen from a crown side with the crown being removed.

A Francis turbine runner 20 includes a crown 22, a plurality of runner blades 21 and a band 23. A rotating shaft 28 (spindle) of a Francis turbine is connected at a center of crown 22. A plurality of runner blades 21 (runner vanes) are circumferentially arranged between crown 22 and band 23. In other words, band 23 is coaxially coupled with crown 22 by blades 21. An outer end of each blade 21 is referred to as a leading edge 24, where water comes in during a turbine operation. Francis turbine runner 20 is driven and rotates around a rotation axis, which is corresponding to a center CL of rotating shaft 28, toward a turbine direction during the turbine operation. Leading edges (inlet edges) 24 of blades 21 are formed as a curve 27 that is convex in a turbine direction, which is a rotation direction during the turbine operation. On a leading edge 24 formed as curve 27, a local maximum point M exists between a band side root 25 (referred to as a band connecting point, where leading edge 24 and band 23 are connected) and a crown side root 26 (referred to as a crown connecting point, where leading edge 24 and crown 22 are connected). Local maximum point M is a point where circumferential distance from the band connecting point is set to be locally maximized. In this embodiment, a circumferential distance from band connecting point 25 is the largest in the turbine direction at local maximum point M on leading edge 24. Leading edge 24 leans toward the turbine direction from band connecting point 25 with respect to a straight line SL, which connects between band connecting point 25 and crown connecting point 26.

Further detail may be explained with introducing a cylindrical coordinate system. The cylindrical coordinate system, which uses r, θ, and z as parameters, can be introduced in the embodiment of FIG. 1 such that, (a) a rotation center (rotation axis) CL of a rotating shaft 28 is the z-axis, where crown 22 side is set to positive, and (b) a positive direction of θ is set to the turbine direction, which is a rotation direction of the turbine operation.

Considering leading edge 24, if this embodiment is projected to a cylindrical surface having a fixed radius r, a projected profile of leading edge 24 satisfies, $$\frac{\partial^2 \theta}{\partial z^2} < 0,$$

near b and connecting point 25 (band side). Further, the z value at band connecting point 25 is defined as z=0, which means an origin of the z axis is set at band connecting point 25. In this situation, the z value at crown connecting point 26 is defined as z=B, the projected profile of leading edge 24 has a value of z that satisfies, $$\frac{\partial \theta}{\partial z} = 0,$$

in a range of $$0 < z < B.$$

In other words, the profile of leading edge 24 has a point that satisfies the above formula between both ends, which is between (and does not include) band connecting point 25 and crown connecting point 26, when an origin of the cylindrical coordinate system is set on the rotation axis 28 at a position of band connecting point 25. The point on the leading edge 24 that satisfies the above formula corresponds to the local maximum point M of the leading edge 24.

In FIG. 1 and FIG. 2, a symbol 29 indicates pressure surfaces of the runner blades 21; and a symbol 30 indicates suction surfaces of the runner blades 21 respectively.

It is known to form the leading edge as a curve in the conventional Francis turbine runner. The leading edges in these conventional Francis turbine runners have just a monotonically curved profile. When the Francis turbine runner rotates during the turbine operation, water coming from the leading edge tends to have a flow that is along the profile of the leading edge. Thus, the monotonically curved profile of the leading edge in conventional arts causes a flow from the crown side toward the band side or the band side toward the crown side, resulting in a generation of secondary flow.

On the other hands, Francis turbine runner 20 according to the embodiment that incorporates runner blades 21 having the above mentioned configuration referred to in FIGS. 1 and 2 is configured to have local maximum point M of leading edge 24 between band connecting point 25 and crown connecting point 26, flows from the crown side toward the band side and the band side toward the crown side tend to be weakened on the surface of blades 21. Therefore, the embodiment may reduce a generation of the secondary flow and improve a hydraulic efficiency.

Figure 3:
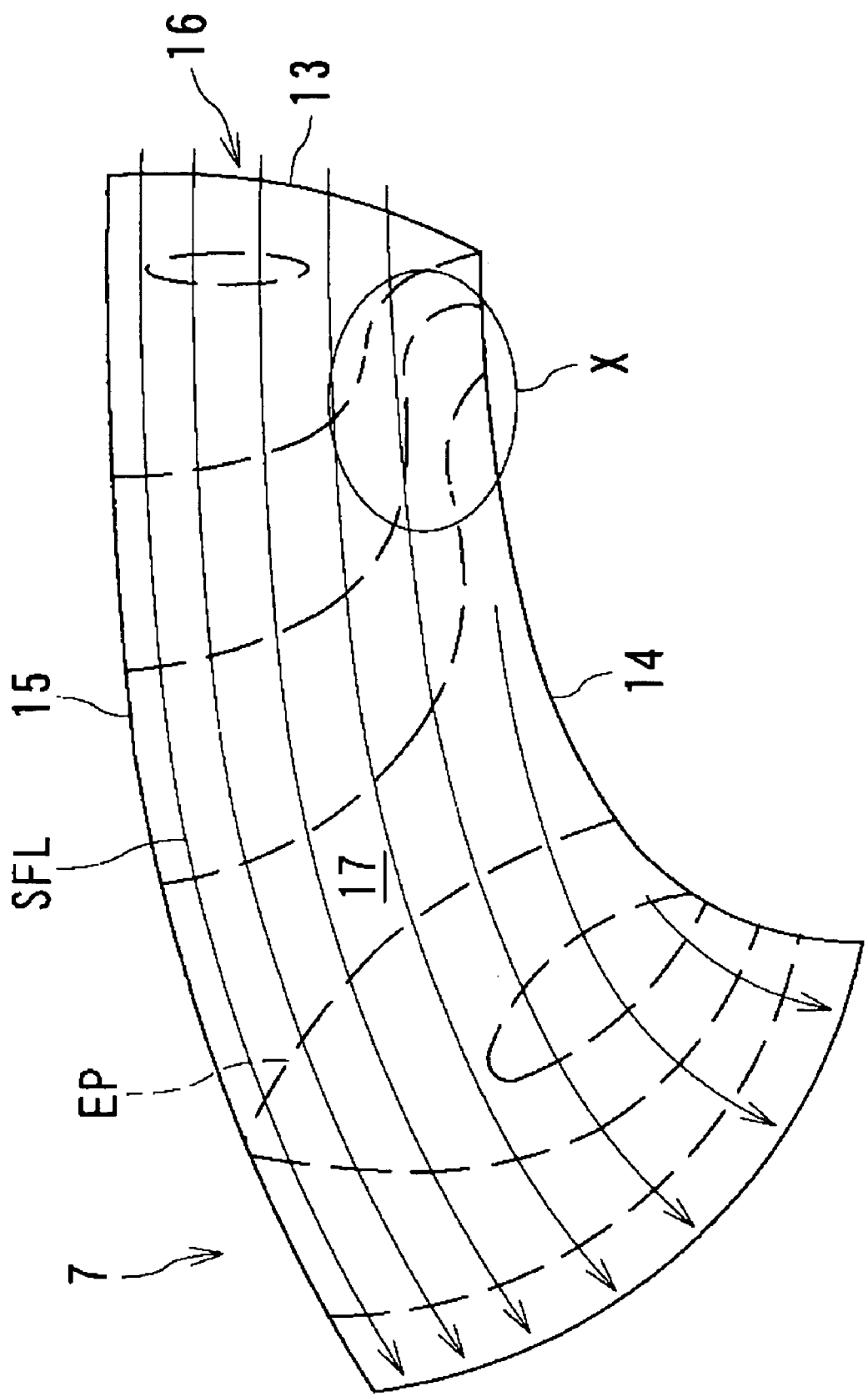
FIG. 3 is a schematic exploded view of a conventional blade for a Francis turbine runner, schematically showing a result of a simulation of a pressure distribution on the suction surface during the turbine operation.

FIG. 3 is a schematic exploded view of the conventional blade for the Francis turbine runner, schematically showing a result of a simulation of a pressure distribution on the suction surface during the turbine operation.

In FIG. 3, a symbol 7 is a blade, a symbol 13 is a leading edge, a symbol 14 is a band (band side root), a symbol 15 is a crown (crown side root), and a symbol 17 indicates a suction surface. In FIG. 3, a symbol SFL indicates a stream line (line of flow) and a symbol EP indicates a constant pressure line. In this conventional blade 7, leading edge 13 monotonically leans toward the turbine direction from band side 14 to crown side 15 as a curve.

As shown in FIG. 3, pressure distribution is distorted around "X" region, which means that a flow toward band side root 14 is generated in the "X" region because of a monotonic curved profile of leading edge 13. The flow toward band side root 14 around the "X" region is corresponding to secondary flow.

Figure 4:
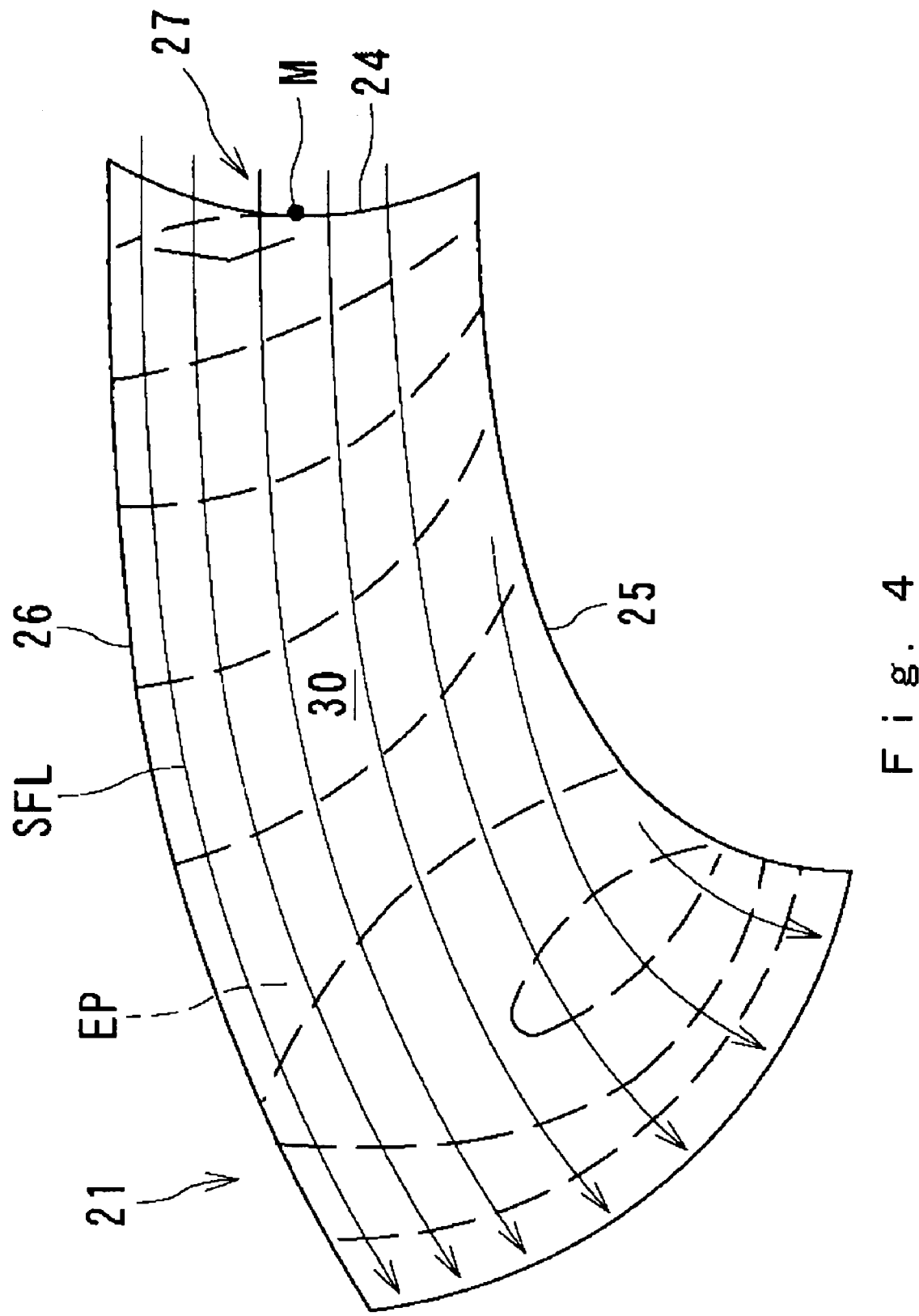
FIG. 4 is a schematic exploded view of the blade for the Francis turbine runner according to this embodiment, schematically showing a result of a simulation of a pressure distribution on the suction surface during the turbine operation.

FIG. 4 is a schematic exploded view of the blade for the Francis turbine runner according to this embodiment, schematically showing a result of a simulation of a pressure distribution on the suction surface during the turbine operation. In FIG. 4, the same symbols are used to indicate corresponding features as in FIGS. 1 and 2. A symbol SFL indicates a stream line (line of flow) and a symbol EP indicates a constant pressure line. Leading edge 24 of the runner blade 21 is formed to be a curve 27 having a local maximum point M of the leading edge 24.

As shown in FIG. 4, the pressure distortion found near leading edge 13 of the band side root 14 in FIG. 3 is not found. This means a flow in a direction different from stream line SFL is hardly generated, resulting in reduction of the secondary flow. Reduction of the secondary flow on the suction surface may improve hydraulic efficiency of the Francis turbine runner. Especially, since there is no pressure distortion at suction surface 30 side, the turbine efficiency in partial load operation of the Francis turbine may be improved.

Figure 5:
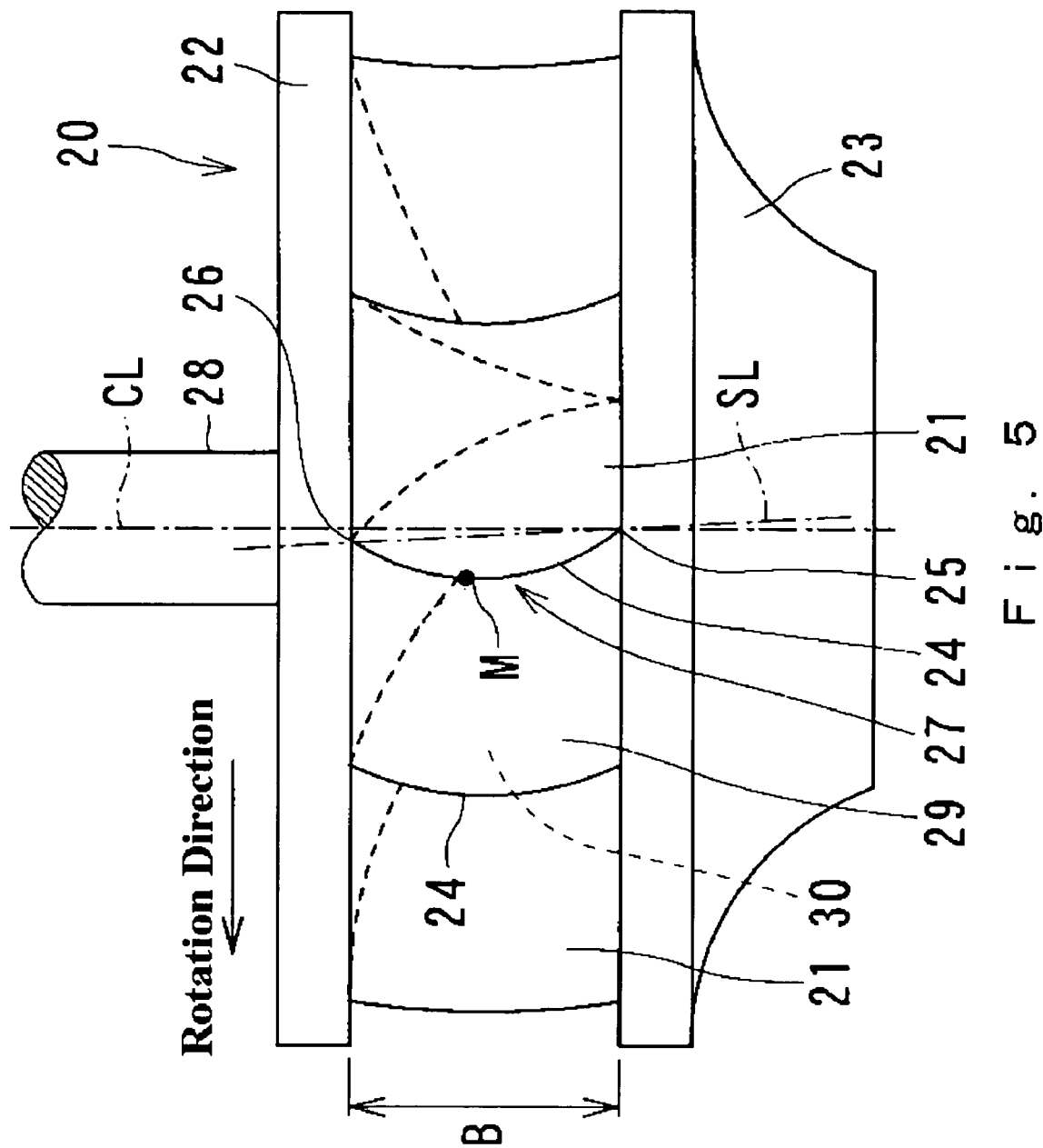
FIG. 5 is a schematic side view of a runner for a Francis turbine, according to a modification of the first embodiment.

In the embodiment shown in FIGS. 1 and 2, straight line SL connecting between band connecting point 25 and crown connecting point 26 is parallel to the rotation center CL of rotating shaft (rotation axis) 28. Line SL may not necessarily be parallel. It may be determined preferably depending on a condition such as a level of turbine capacity (output). FIG. 5 is a modification of the first embodiment, showing the case in which line SL is not parallel to the rotation axis. In FIG. 5, the same symbols are used for the same components as in FIGS. 1 and 2. Detailed descriptions are omitted for the same component as referred to FIGS. 1 and 2.

As shown in FIG. 5, in this modification, straight line SL connecting between band connecting point 25 and crown connecting point 26 is not parallel to the rotation axis CL of spindle (rotation shaft) 28. In such configuration, distortion is not found in the pressure distribution on suction surface 30 like in FIG. 4, and the generation of the secondary flow may be reduced.

As shown hereinbefore, in this embodiment, the shape of leading edge 24 of runner blade 21 is formed to be the curve 27 that is convex in the turbine direction. On the leading edge 24 formed to be that curve 27, local maximum point M of the leading edge 24, at which the circumferential distance in the turbine direction from the band connecting point 25 is the largest, is located between band connecting point 25 and crown connecting point 26. Leading edge 24 leans toward the turbine direction from b and connecting point 25 with respect to the straight line SL, which connects between band connecting point 25 and crown connecting point 26.

As described in FIGS. 1, 2, 4, and 5, local maximum point M of leading edge 24 is located between band connecting point 25 and crown connecting point 26. Consideration of a hydraulic loss with regard to a position in a vertical direction of local maximum point M, which is the z value of local maximum point M in the cylindrical coordinate system, is explained below.

Figure 6:
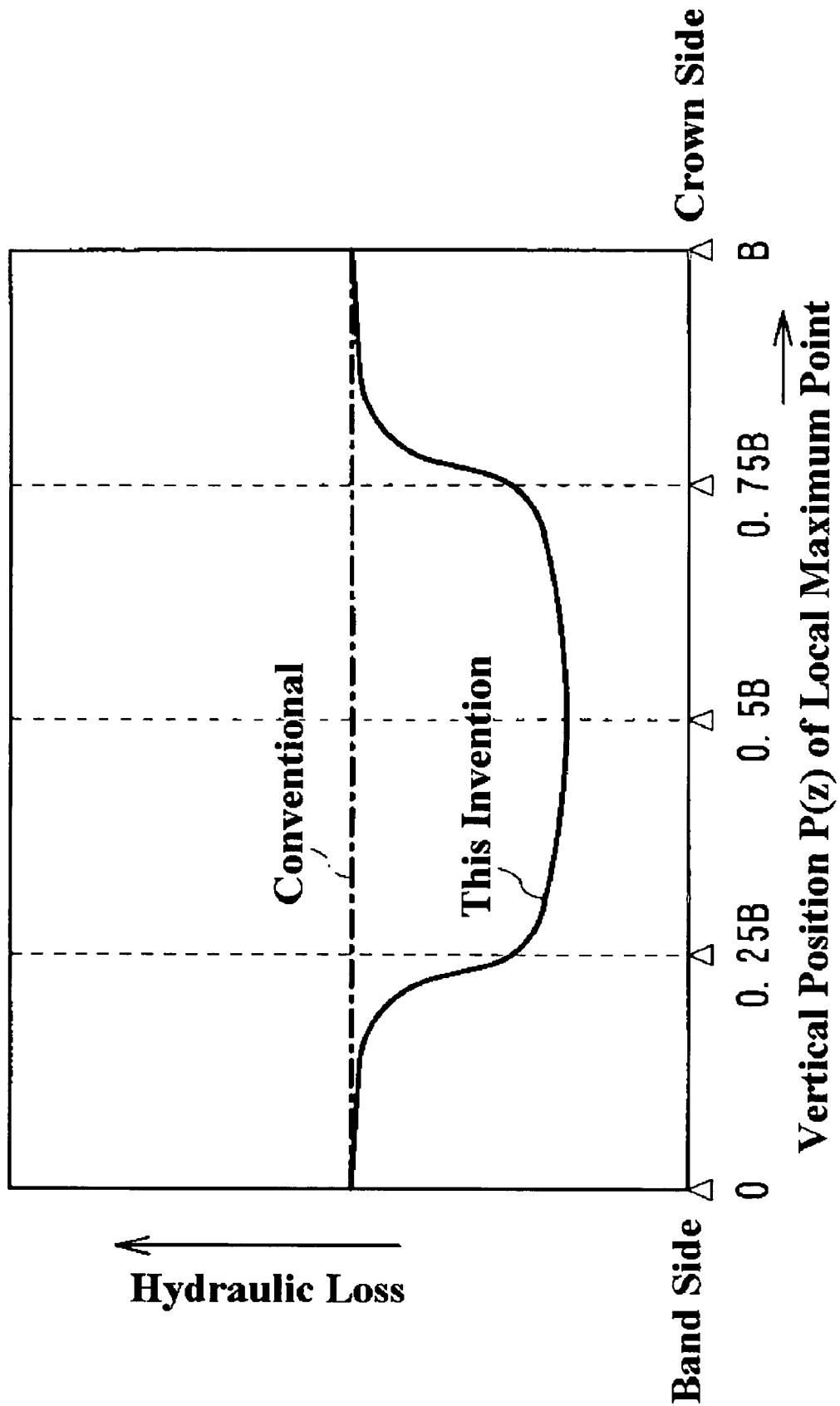
FIG. 6 is a graph showing a hydraulic loss in a Francis runner regarding to a vertical position of local maximum point M of the leading edge.

FIG. 6 is a graph showing the loss of Francis runner 20 in relation to a vertical position of local maximum point M of the leading edge 24. The horizontal axis indicates a vertical position P(z) of the local maximum point M, while the vertical axis indicates the hydraulic loss. In FIG. 6, the cylindrical coordinate system is also considered. An origin of z, where a value of z equals zero, is set at b and connecting point 25 and the z value of crown connecting point 26 is defined as B.

As shown in FIG. 6, position P(z) of local maximum point M of the leading edge may preferably be in a range of, $0.25B \leq P(z) \leq 0.75B$, to reduce the hydraulic loss of the Francis turbine runner 20.

Next, a circumferential position of the local maximum point M of the leading edge in the similar cylindrical coordinate system is described below.

Figure 7:
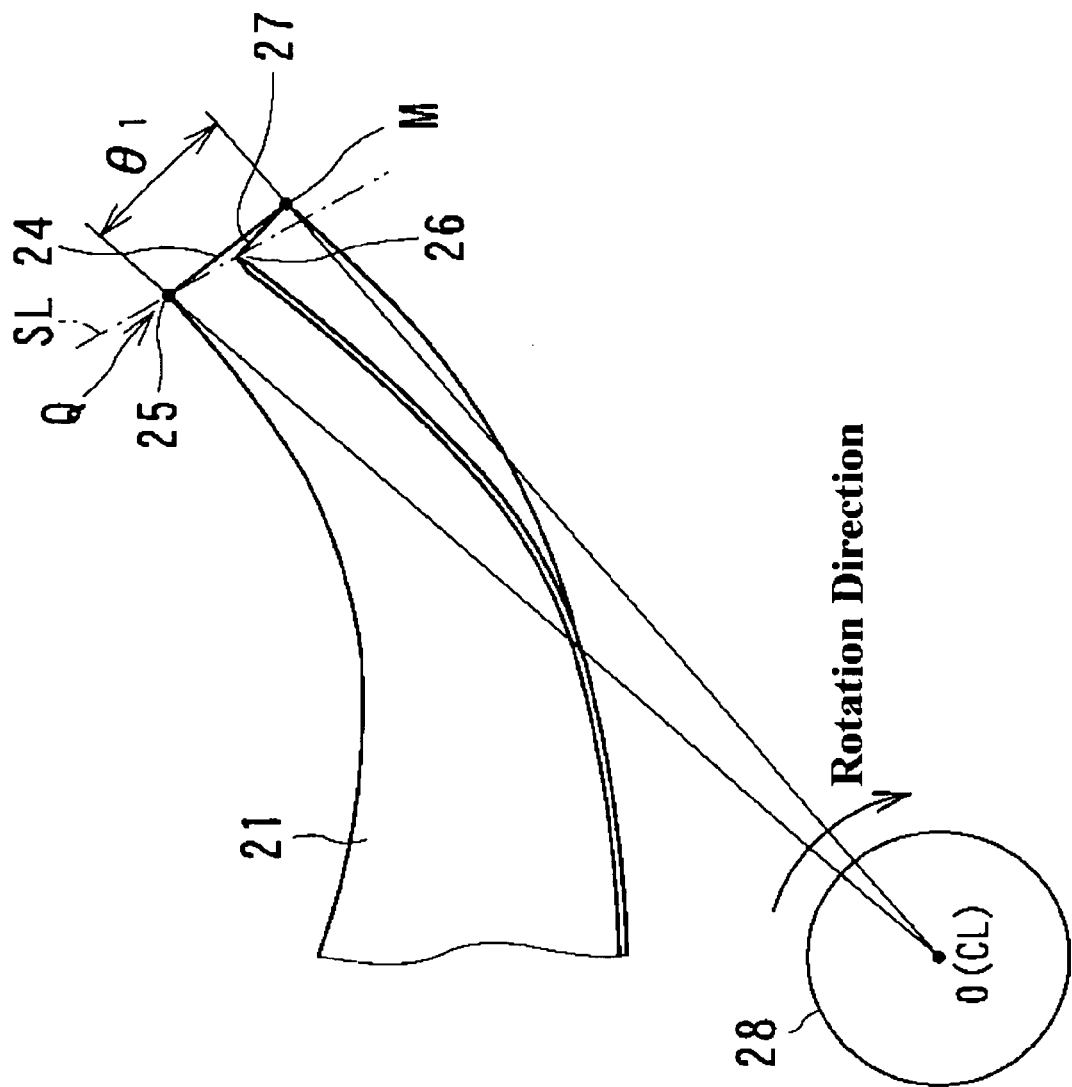
FIG. 7 is an expanded plan view of a single runner blade according to the first embodiment.

FIG. 7 is an expanded plan view of the plan view shown in FIG. 2 for a single runner blade 21. A trailing edge side of the runner blade is omitted in FIG. 7. In FIG. 7, a symbol O indicates the rotation axis CL of the rotating shaft (spindle) 28, and Q indicates a position of the band connecting point 25 of leading edge 24. The same components as in FIG. 2 are marked with same symbols and omitted to be described. Although the straight line SL is formed parallel to the rotation center CL in FIG. 2, FIG. 7 is not limited to this.

Again in FIG. 7, an origin is set at the point CL (also referred to as O). The turbine direction is defined as the positive direction of θ. The origin of θ, which means the direction where θ equals zero, is defined at a direction of point Q of band connecting point 25. The value of θ at the local maximum point M of leading edge 24 is referred to as $\theta_1$.

Figure 8:
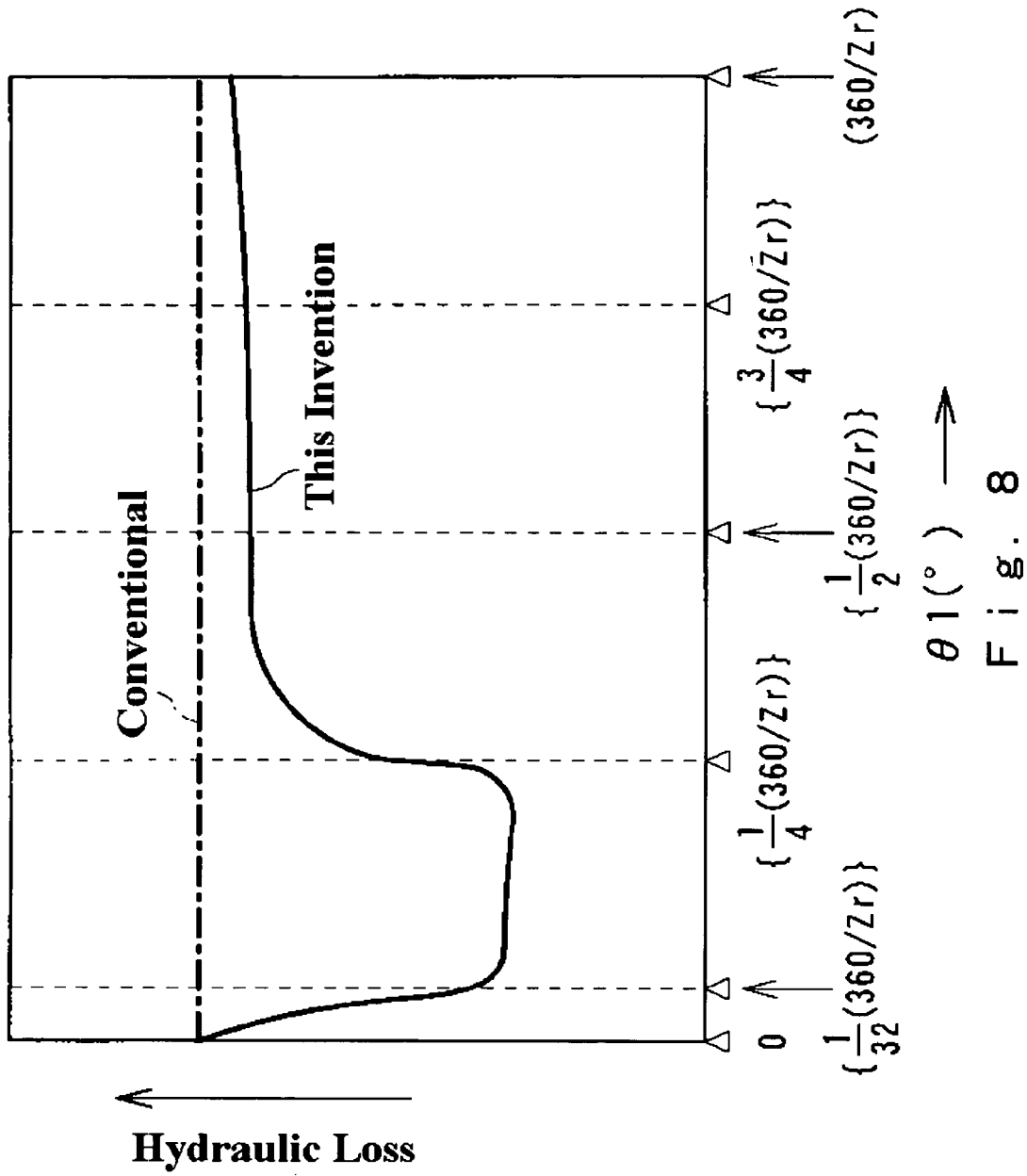
FIG. 8 is a graph showing the loss of the runner 20 with regard to the circumferential distance between the band connecting point and the local maximum point.

FIG. 8 is a graph showing the loss of the runner 20 with regard to the value of $\theta_1$, which means the circumferential position of local maximum point M of leading edge 24. In other words, $\theta_1$ is an angle between a line OQ and a line OM, which can be defined on the plane perpendicular to rotation axis CL. In FIG. 8, Zr indicates the number of blades 21 in FIG. 1, 2, or 5.

As shown in FIG. 8, $\theta_1$, which is defined as 0 at the position Q of band connection point 25, may preferably be in a range of, $$\frac{1}{32}\frac{360}{Zr} \leq \theta_1 \leq \frac{1}{4}\frac{360}{Zr} \text{ degrees,}$$

to reduce the hydraulic loss in the Francis turbine runner 20.

As mentioned, straight line SL, which is connecting between band connecting point 25 and connecting point 26, may not be parallel to the rotation axis CL of the spindle (rotating shaft) 28 as shown in FIG. 5, and the affect of varying SL is described below.

Figure 9:
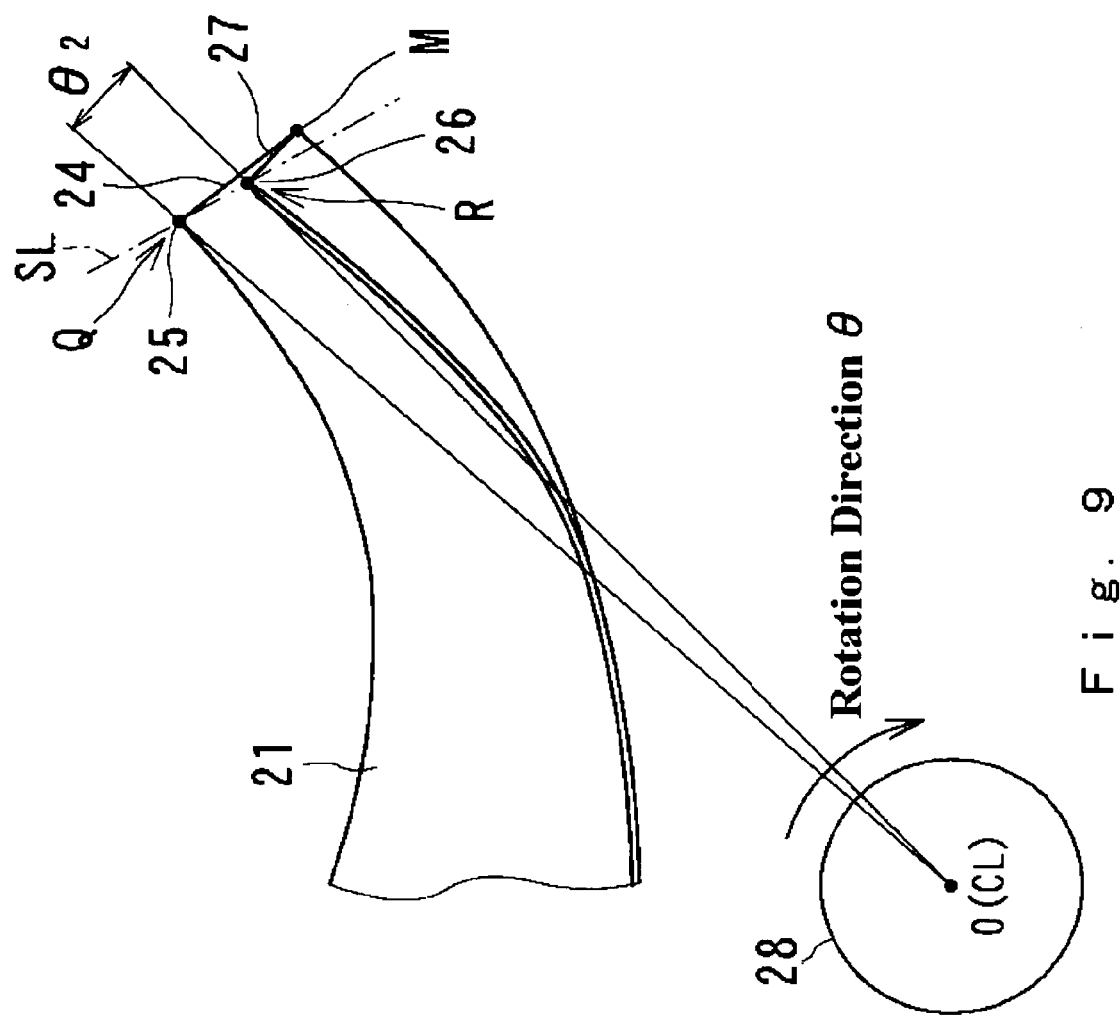
FIG. 9 is an expanded plan view of a single runner blade according to the first embodiment.

FIG. 9 is an expanded plan view of the plan view shown in FIG. 2 for a single runner blade 21. The trailing edge side of the runner blade is omitted from FIG. 9. In FIG. 9, a symbol O indicates the rotation axis CL of the rotating shaft (spindle) 28. Q indicates a position of the band connecting point 25 of leading edge 24. R indicates a position of the crown connecting point 26 of leading edge 24. The same components as in FIG. 2 are marked with the same symbols and are not described. Although the straight line SL is formed parallel to the rotation center CL in FIG. 2, FIG. 9 is not limited to this.

Again in FIG. 9, an origin is set at the point CL (also referred to as O). The turbine direction is defined as the positive direction of θ. The origin of θ, which means the direction where θ equals zero, is defined at a direction of point Q of band connecting point 25. The value of θ at point R, which is the crown connecting point 26 of leading edge 24, is referred to as $\theta_2$.

Figure 10:
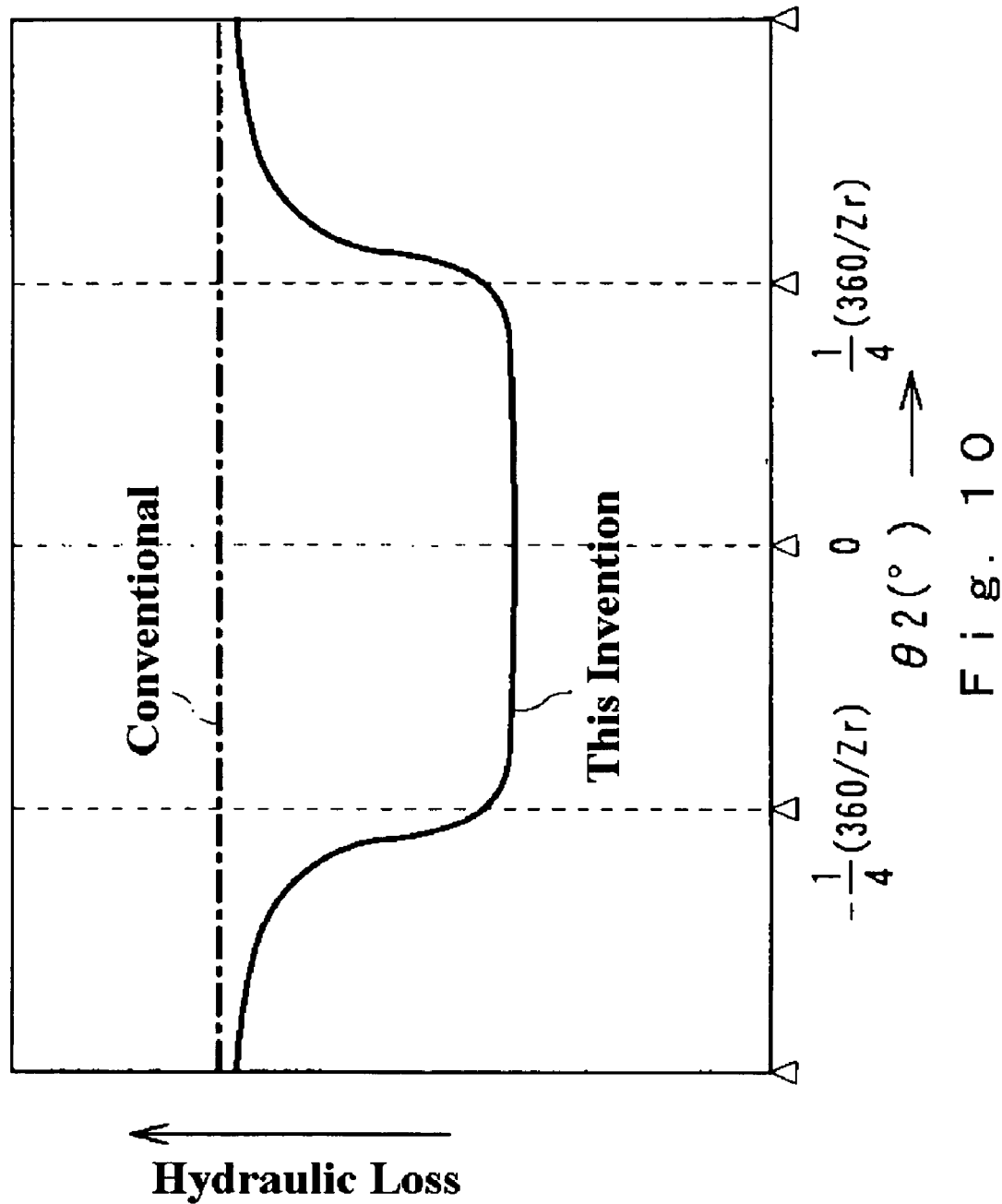
FIG. 10 is a graph showing the loss of the runner 20 with regard to the circumferential distance between the band connecting point and the crown connecting point.

FIG. 10 is a graph showing the loss of the runner 20 with regard to the value of $\theta_2$, which means the circumferential position of crown connecting point 26 of leading edge 24. In other words, the $\theta_2$ is an angle between a line O Q and a line O R, which can be defined on the plane perpendicular to rotation axis CL. In FIG. 10, Zr indicates the number of blades 21 in FIG. 1, 2, or 5.

As shown in FIG. 10, $\theta_2$, which is defined as 0 at the position Q of band connection point 25, may preferably be in a range of, $$|\theta_2| \le \frac{1}{4}\frac{360}{Zr} \text{ degrees, which is otherwise referred to as,}$$

$$-\frac{1}{4}\frac{360}{Zr} \le \theta_2 \le \frac{1}{4}\frac{360}{Zr} \text{ degrees,}$$

to reduce the hydraulic loss in the Francis turbine runner 20.

As described above, in this embodiment, local maximum point M of the leading edge 24 is positioned between band connecting point 25 and crown connecting point 26. Therefore, the circumferential position $\theta_1$ of local maximum point M and the circumferential position $\theta_2$ of the point R, which is crown connecting point 26, referred to in FIGS. 9 and 10, are generally in a relation of, $$\theta_1 > \theta_2.$$

However, this embodiment can be applied, even in the case of, $$\theta_1 \le \theta_2.$$

Figure 11:
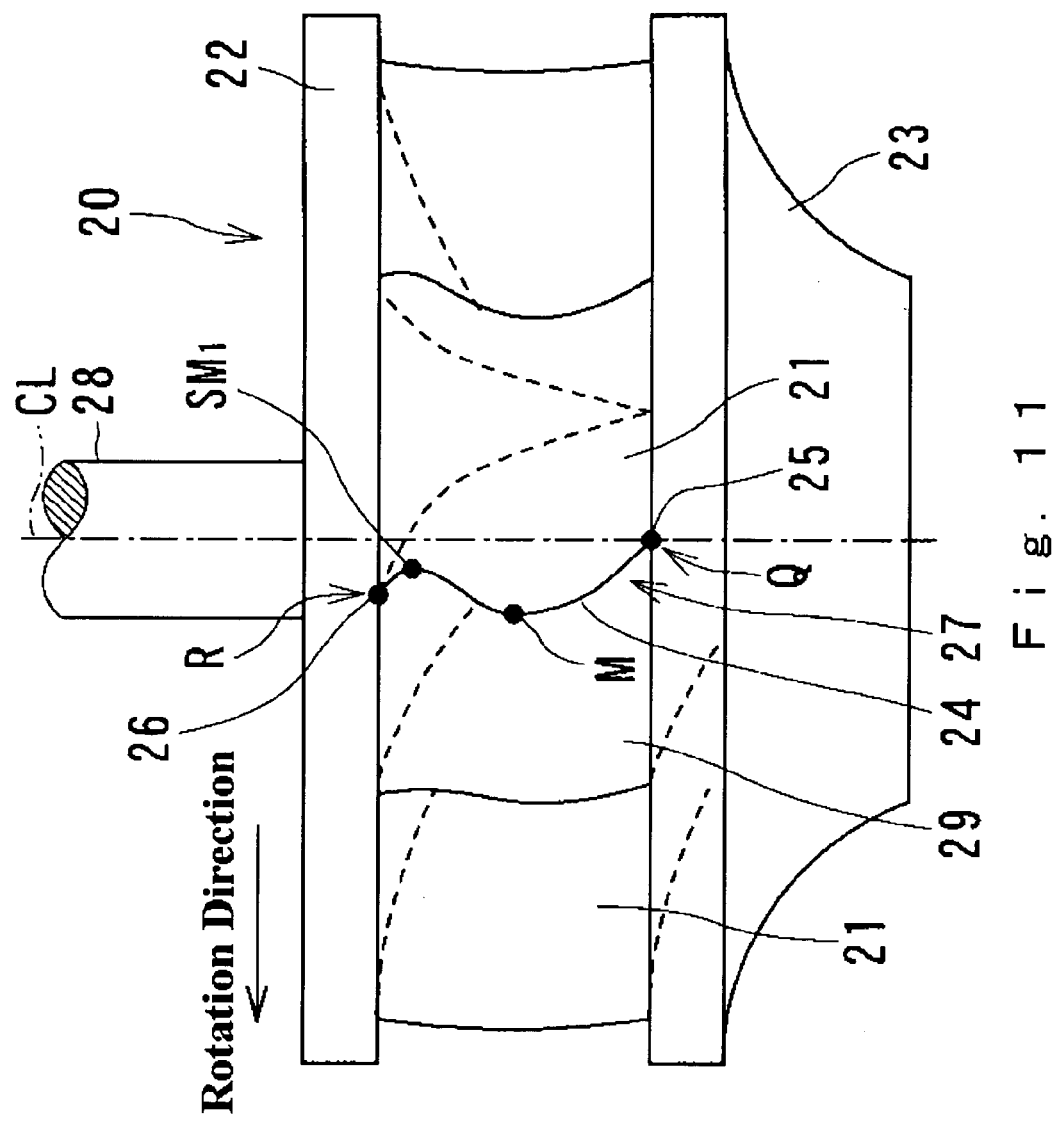
FIG. 11 is a side view of the Francis turbine runner seen from an outer circumference side of the runner according to another modification of the first embodiment.

Another modification of the embodiment, which may be applied to the above mentioned case is explained in reference to FIG. 11.

FIG. 11 is a side view of the Francis turbine runner seen from an outer circumference side of the runner. In FIG. 11, the same components as in FIGS. 1, 2, 4, and 5 are marked with the same symbols and are not described in detail.

In this modification, local maximum point M exists on leading edge 24 of blade 21 between band connecting point 25 and crown connecting point 26. Local maximum point M of leading edge 24 is the point at which the circumferential distance from band connecting point 25 is set to be locally maximized in the turbine direction. In addition, a local minimum point SM1 of the leading edge exists on the side of crown 22 of the local maximum point M on leading edge 24. Local minimum point SM is a point at which the circumferential distance from band connecting point 25 is set to be locally minimized in the turbine direction. The cylindrical coordinate system can be introduced to this modification such that, (a) the rotation center (rotation axis) CL of the rotating shaft 28 is defined as the z-axis, where crown 22 side is set to positive, and (b) a positive direction of $\theta$ is set to the turbine direction, which is a rotation direction of the turbine operation.

Considering leading edge 24 in this embodiment is projected to a cylindrical surface having a fixed radius r, the projected profile of the leading edge 24 is formed to be convex in a rotation direction of $\theta$ from band connecting point 25, and has an inflection point relating to $\theta$ between local maximum point M of leading edge 24 and local minimum point SM1 of leading edge 24. The projected curve of the leading edge 24 is configured to be a curve that is concave in the rotation direction from the inflection point to the crown 22 side. In other words, a projected profile of leading edge satisfies, $$\frac{\partial \theta}{\partial z} = 0 \text{ and } \frac{\partial^2 \theta}{\partial z^2} < 0 \text{ at the local maximum point } M, \text{ and}$$

$$\frac{\partial \theta}{\partial z} = 0 \text{ and } \frac{\partial^2 \theta}{\partial z^2} > 0 \text{ at the local minimum point } SM1.$$

By such configuration, a circumferential distance of the crown connecting point 26 (also referred to as a symbol R) may be made larger than the circumferential distance of local maximum point M of the leading edge. With this modification, the pressure distortion on suction surface 30 of blade 21 is inhibited, as the blade 21 shown in FIG. 4, and results in a reduction of the secondary flow. Reduction of the secondary flow on the suction surface may improve hydraulic efficiency of the Francis turbine runner.

Other embodiments of the present invention will be apparent to those skilled in the art from consideration of the specification and practice of the invention disclosed herein.

What is claimed is:

1. A Francis turbine, comprising:
   a rotating shaft;
   a crown rotating with the rotating shaft;
   a plurality of blades circumferentially arranged on the crown, each of which includes an outer end as a leading edge;
   a band coaxially coupled with the crown by the blades; and
   a local maximum point existing between the crown and the band on at least one of the leading edges;
   wherein the rotating shaft, the crown, the blades, and the band as a whole are driven by water and rotate toward turbine direction during a turbine operation,
   wherein the leading edge has a band connecting point where the band and the leading edge are connected,
   wherein the leading edge leans toward the turbine direction from the band connecting point,
   wherein a circumferential distance in the turbine direction between the band connecting point and the leading edge is the largest at the local maximum point,
   wherein a distance P between the band and the local maximum point along a direction of a center axis of the rotating shaft is expressed, using a distance B between the band and the crown along the direction of the center axis of the rotating shaft, as
   (a) $0.25B \le P \le 0.75B$.

2. A Francis turbine according to claim 1, further comprising:
   a local minimum point existing on the leading edge, on which the local maximum point is existing;
   wherein the local minimum point is located at the crown side of the local maximum point.

3. A Francis turbine according to claim 1,
   wherein a number of the blades is Zr,
   wherein an angle $\theta_1$ can be defined on a perpendicular plane, which is perpendicular to a center axis of the rotating shaft, by a line from the center axis to the band connecting point and a line from the center axis to the local maximum point,
   wherein the angle $\theta_1$ is in a range of (a) $\frac{1}{32}\frac{360}{Zr} \le \theta_1 \le \frac{1}{4}\frac{360}{Zr}$ degrees.

4. A Francis turbine according to claim 1,
   wherein the leading edge has a crown connecting point where the crown and the leading edge are connected, wherein a number of the blades is Zr,
wherein an angle $\theta_2$ can be defined on a perpendicular plane, which is perpendicular to a center axis of the rotating shaft, by a line from the center axis to the band connecting point and a line from the center axis to the crown connecting point,
wherein the angle $\theta_2$ is in a range of (a) $|\theta_2| \le \frac{1}{4}\frac{360}{Zr}$ degrees.

5. A Francis turbine runner that is rotatable around a rotation axis, comprising:
a crown, which can rotate around the rotation axis;
a plurality of blades circumferentially arranged on the crown, each of which includes an outer end as a leading edge;
a band coaxially coupled with the crown by the blades; and
a local maximum point existing between the crown and the band on at least one of the leading edges;
wherein the crown, the blades, and the band as a whole are driven by water and rotate toward a turbine direction during a turbine operation,
wherein a circular cylindrical coordinate system defined by parameters r, $\theta$, and z can be introduced such that
(a) an origin is set on the rotation axis at a position where the leading edge and the band connect,
(b) a positive direction of $\theta$ is set to the turbine direction,
(c) a positive direction of z is set toward a direction of the crown,
wherein a projected profile of the leading edge on a cylindrical surface expressed by the cylindrical coordinate system using $\theta$ and z is as below:

(d) $\frac{\partial^2 \theta}{\partial z^2} < 0$ at least in the band side, (e) $\frac{\partial \theta}{\partial z} = 0$ at the local maximum point.

6. A Francis turbine runner according to claim 5, further comprising:
a local minimum point existing on the leading edge, which the local maximum point is existing;
wherein the projected profile of the leading edge on the cylindrical surface expressed by the cylindrical coordinate system using $\theta$ and z is as below:

(f) $\frac{\partial \theta}{\partial z} = 0$ at the local minimum point, (g) $\frac{\partial^2 \theta}{\partial z^2} > 0$ at the local minimum point.

7. A Francis turbine runner according to claim 5,
wherein a value of z at the crown is B,
wherein a value of z at the local maximum point is in a range of
(f) $0.25B \le z \le 0.75B$.
8. A Francis turbine runner according to claim 5,
wherein a number of the blades is Zr,
wherein an origin of $\theta$ is set at a point where the leading edge and the band are connected,
wherein a value of $\theta$ at the local maximum point is in a range of (f) $\frac{1}{32}\frac{360}{Zr} \le \theta \le \frac{1}{4}\frac{360}{Zr}$ degrees.

9. A Francis turbine runner according to claim 5,
wherein a number of the blades is Zr,
wherein an origin of $\theta$ is set at a point where the leading edge and the band are connected,
wherein a value of $\theta$ at a point where the leading edge and the crown are connected is in a range of $(f) - \frac{1}{4}\frac{360}{Zr} \le \theta \le \frac{1}{4}\frac{360}{Zr}$ degrees.

10. A Francis turbine, comprising:
a rotating shaft;
a crown rotating with the rotating shaft;
a plurality of blades circumferentially arranged on the crown, each of which includes an outer end as a leading edge;
a band coaxially coupled with the crown by the blades; and
a local maximum point existing between the crown and the band on at least one of the leading edges;
wherein the rotating shaft, the crown, the blades, and the band as a whole are driven by water and rotate toward turbine direction during a turbine operation,
wherein the leading edge has a band connecting point where the band and the leading edge are connected,
wherein the leading edge leans toward the turbine direction from the band connecting point,
wherein a circumferential distance in the turbine direction between the band connecting point and the leading edge is the largest at the local maximum point, and further comprising:
a local minimum point existing on the leading edge, on which the local maximum point is existing;
wherein the local minimum point is located at the crown side of the local maximum point.
11. A Francis turbine, comprising:
a rotating shaft;
a crown rotating with the rotating shaft;
a plurality of blades circumferentially arranged on the crown, each of which includes an outer end as a leading edge;
a band coaxially coupled with the crown by the blades; and
a local maximum point existing between the crown and the band on at least one of the leading edges;
wherein the rotating shaft, the crown, the blades, and the band as a whole are driven by water and rotate toward turbine direction during a turbine operation,
wherein the leading edge has a band connecting point where the band and the leading edge are connected,
wherein the leading edge leans toward the turbine direction from the band connecting point,
wherein a circumferential distance in the turbine direction between the band connecting point and the leading edge is the largest at the local maximum point,
wherein a number of the blades is Zr, wherein an angle $\theta_1$ can be defined on a perpendicular plane, which is perpendicular to a center axis of the rotating shaft, by a line from the center axis to the band connecting point and a line from the center axis to the local maximum point, wherein the angle $\theta_1$ is in a range of (a) $\dfrac{1}{32}\dfrac{360}{Zr} \leq \theta_1 \leq \dfrac{1}{4}\dfrac{360}{Zr}$ degrees.

12. A Francis turbine, comprising:

a rotating shaft;

a crown rotating with the rotating shaft;

a plurality of blades circumferentially arranged on the crown, each of which includes an outer end as a leading edge;

a band coaxially coupled with the crown by the blades; and a local maximum point existing between the crown and the band on at least one of the leading edges;

wherein the rotating shaft, the crown, the blades, and the band as a whole are driven by water and rotate toward turbine direction during a turbine operation, wherein the leading edge has a band connecting point where the band and the leading edge are connected, wherein the leading edge leans toward the turbine direction from the band connecting point, wherein a circumferential distance in the turbine direction between the band connecting point and the leading edge is the largest at the local maximum point, wherein the leading edge has a crown connecting point where the crown and the leading edge are connected, wherein a number of the blades is $Zr$, wherein an angle $\theta_2$ can be defined on a perpendicular plane, which is perpendicular to a center axis of the rotating shaft, by a line from the center axis to the band connecting point and a line from the center axis to the crown connecting point, wherein the angle $\theta_2$ is in a range of (a) $|\theta_2| \leq \dfrac{1}{4}\dfrac{360}{Zr}$ degrees.

* * * * *